(12) United States Patent
Yamamoto et al.

(10) Patent No.: US 9,331,529 B2
(45) Date of Patent: May 3, 2016

(54) ACTUATOR

(71) Applicant: SEIKO PRECISION INC., Narashino-shi, Chiba (JP)

(72) Inventors: Masami Yamamoto, Narashino (JP); Kenichi Kudo, Narashino (JP)

(73) Assignee: SEIKO PRECISION INC., Narashino-shi (JP)

( * ) Notice: Subject to any disclaimer, the term of this patent is extended or adjusted under 35 U.S.C. 154(b) by 406 days.

(21) Appl. No.: 14/044,179

(22) Filed: Oct. 2, 2013

(65) Prior Publication Data

US 2014/0028134 A1     Jan. 30, 2014

Related U.S. Application Data

(63) Continuation of application No. PCT/JP2012/080304, filed on Nov. 22, 2012.

(30) Foreign Application Priority Data

Mar. 1, 2012   (JP) .................................. 2012-044937

(51) Int. Cl.
*H02K 37/00*     (2006.01)
*H02K 1/14*     (2006.01)
(Continued)

(52) U.S. Cl.
CPC ................ *H02K 1/145* (2013.01); *H02K 5/161* (2013.01); *H02K 21/145* (2013.01); *H02K 5/1672* (2013.01)

(58) Field of Classification Search
CPC ............................... H02K 1/243; H02K 1/145

USPC ........ 310/49.09, 49.13, 49.15, 49.51, 156.35, 310/112, 257

See application file for complete search history.

(56) References Cited

U.S. PATENT DOCUMENTS 4,381,465 A * 4/1983 Renkl ................... H02K 19/06
                                                          310/257
7,291,945 B2 * 11/2007 Nashiki ................... H02K 1/145
                                                          310/156.34

(Continued)

FOREIGN PATENT DOCUMENTS

CN         101047330 A     10/2007
CN         101232231 A     7/2008

(Continued)

OTHER PUBLICATIONS

Chinese Office Action issued May 6, 2015 for Chinese Patent Application No. 201280019498.5, with translation.

(Continued)

*Primary Examiner* — Thanh Lam
(74) *Attorney, Agent, or Firm* — Kratz, Quintos & Hanson, LLP

(57) ABSTRACT

An actuator includes: a coil; a permanent magnet rotor secured to and rotatably supported by an output shaft inside the coil; a bobbin made of a non-magnetic material and around which the coil is wound; a first stator inserted into and secured to the bobbin in one direction, and including an inner magnetic pole portion and an outer magnetic pole portion extending inside and outside the coil in an axial direction of the rotor, respectively; and a second stator inserted into and secured to the bobbin in a direction opposite to the one direction, and including an inner magnetic pole portion and an outer magnetic pole portion extending inside and outside the coil in the axial direction of the rotor, respectively.

8 Claims, 4 Drawing Sheets

(51) Int. Cl.
*H02K 5/16* (2006.01)
*H02K 21/14* (2006.01)
*H02K 5/167* (2006.01)

(56) References Cited

U.S. PATENT DOCUMENTS

| | | | |
|---|---|---|---|
| 2002/0180302 A1* | 12/2002 | Takayuki | H02K 1/145 310/257 |
| 2006/0192443 A1* | 8/2006 | Rhyu | H02K 37/14 310/257 |
| 2007/0296294 A1* | 12/2007 | Nobe | F16C 35/02 310/90 |
| 2008/0007126 A1 | 1/2008 | Popov et al. | |
| 2008/0073996 A1* | 3/2008 | Hsiao | H02K 1/145 310/257 |
| 2008/0174209 A1 | 7/2008 | Matsubara | |
| 2009/0066196 A1 | 3/2009 | Suzuki et al. | |
| 2009/0102314 A1* | 4/2009 | Miyata | H02K 1/243 310/257 |
| 2010/0219711 A1* | 9/2010 | Gruendl | H02K 26/00 310/156.25 |

FOREIGN PATENT DOCUMENTS

| | | |
|---|---|---|
| JP | S53-74612 | 6/1978 |
| JP | S57-195353 | 12/1982 |
| JP | S58-78782 | 5/1983 |
| JP | 61-11974 | 4/1986 |
| JP | S61-132066 | 6/1986 |
| JP | S61-269653 | 11/1986 |
| JP | 2003-189584 A1 | 7/2003 |

OTHER PUBLICATIONS

International Search Report for International Application No. PCT/JP2012/080304 dated Feb. 12, 2013.

* cited by examiner

ACTUATOR

CROSS-REFERENCE TO RELATED APPLICATION

This application is a continuation of and claims priority to International Patent Application No. PCT/JP2012/080304 filed on Nov. 22, 2012, which claims priority to Japanese Patent Application No. 2012-044937 filed on Mar. 1, 2012, subject matter of these patent documents is incorporated by reference herein in its entirety.

BACKGROUND (i) Technical Field

The present invention relates to actuators.

(ii) Related Art

A step motor has a permanent magnet rotor and a coil. In order to improve efficiency, a stator is provided.

For example, Japanese Unexamined Patent Application Publication No. 2003-189584 discloses a step motor in which two pairs of plural coils and plural stators are arranged in the circumferential side of a permanent magnet rotor.

However, in the step motor acting as a conventional actuator, it is difficult to provide a uniform gap between the permanent magnet rotor and the stator. Also, the loss might be increased by the magnetic flux leakage and the conversion efficiency might be degraded. Further, a variation in driving speed might be generated.

SUMMARY

It is thus object of the present invention to provide an actuator having a reduced loss caused by the magnetic flux leakage.

According to an aspect of the present invention, there is provided an actuator including: a coil; a permanent magnet rotor secured to and rotatably supported by an output shaft inside the coil; a bobbin made of a non-magnetic material and around which the coil is wound; a first stator inserted into and secured to the bobbin in one direction, and including an inner magnetic pole portion and an outer magnetic pole portion extending inside and outside the coil in an axial direction of the rotor, respectively; and a second stator inserted into and secured to the bobbin in a direction opposite to the one direction, and including an inner magnetic pole portion and an outer magnetic pole portion extending inside and outside the coil in the axial direction of the rotor, respectively, wherein the inner magnetic pole portion and the outer magnetic pole portion of the first stator are arranged alternately in a circumferential direction, and the inner magnetic pole portion and the outer magnetic pole portion of the second stator are arranged alternately in the circumferential direction.

DETAILED DESCRIPTION

Figure 1:
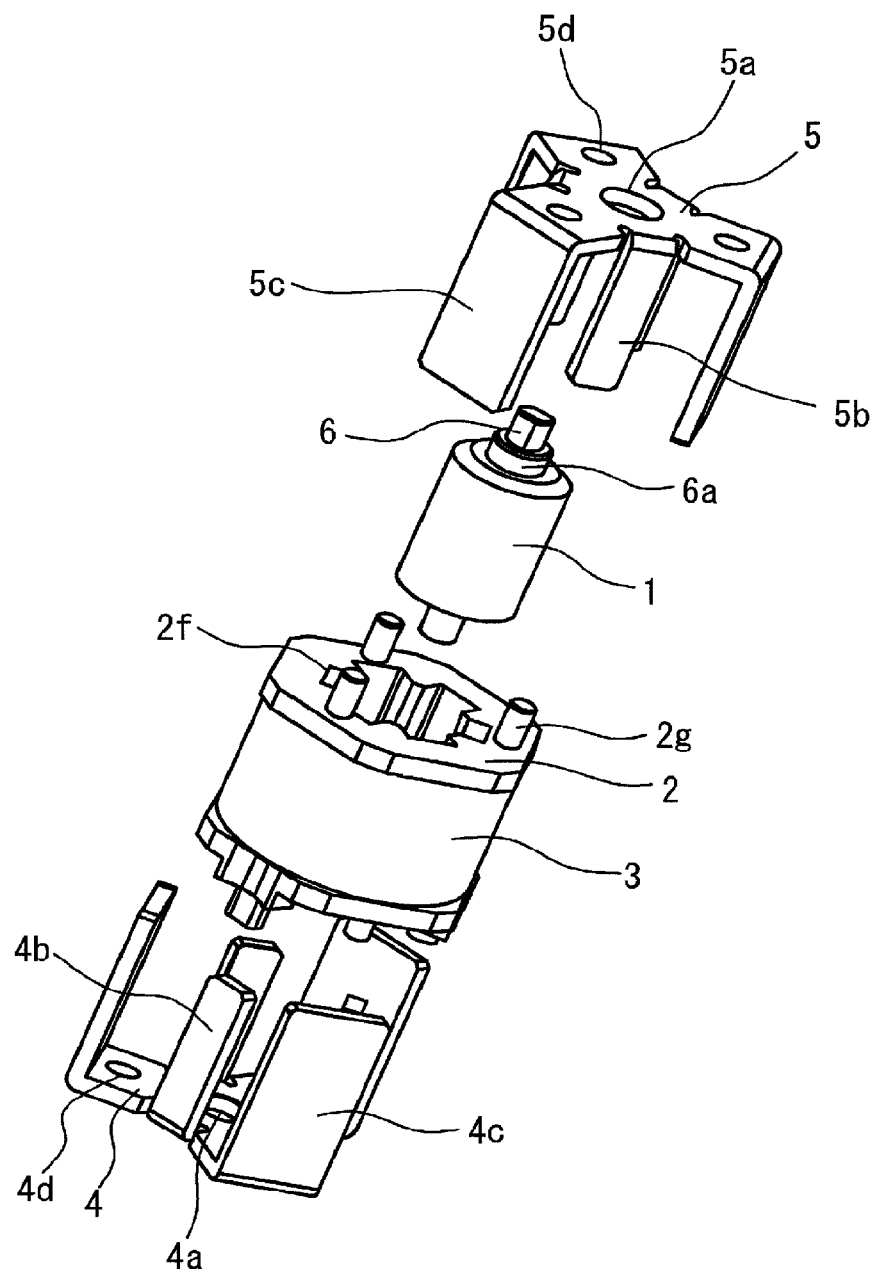
FIG. 1 is an exploded perspective view of component parts in an embodiment according to the present invention.
Figure 2:
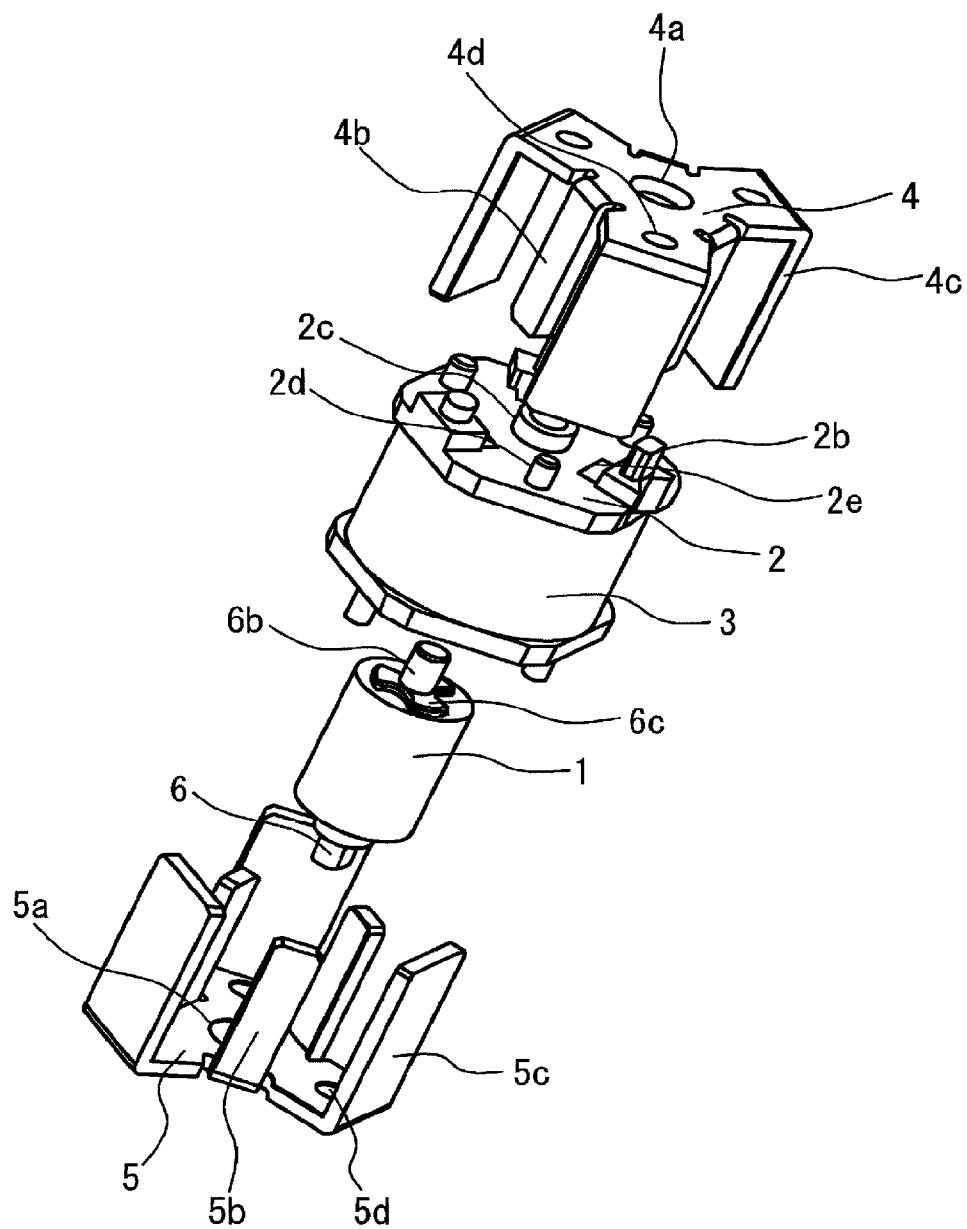
FIG. 2 is an exploded perspective view of the component parts viewed from the opposite side of FIG. 1.
Figure 3:
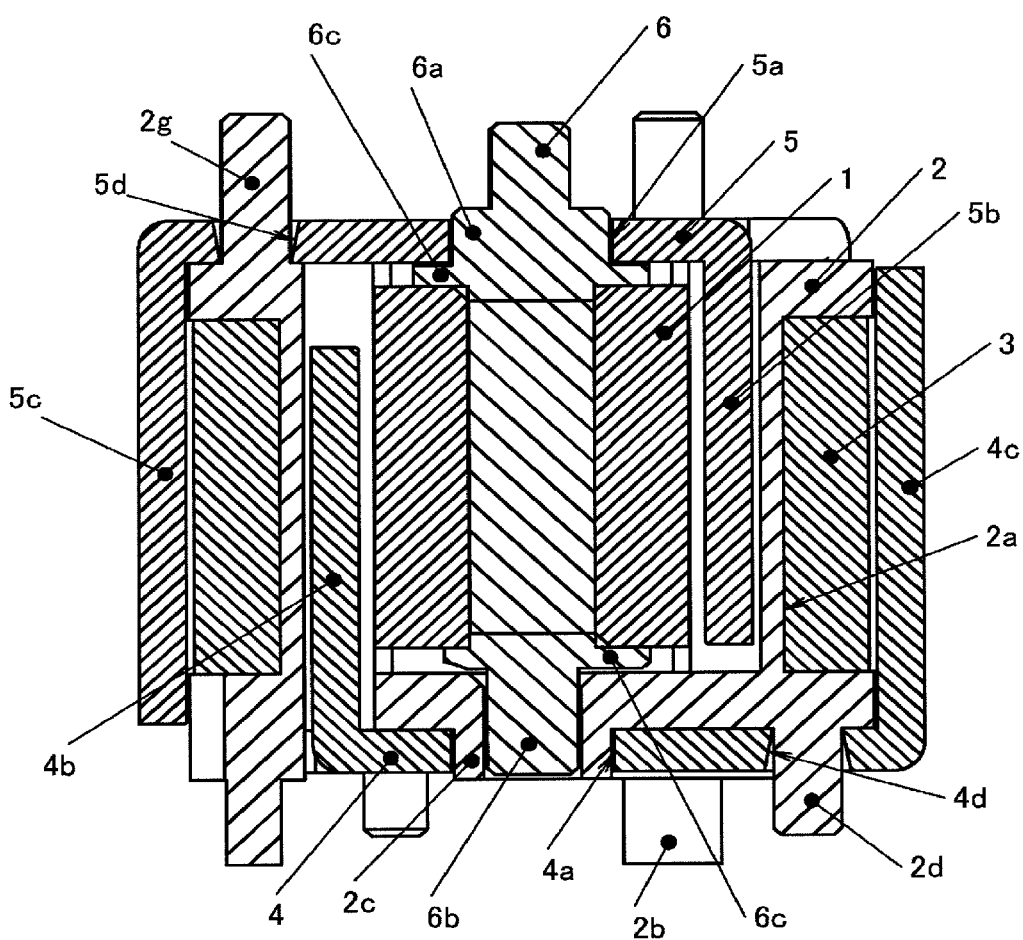
FIG. 3 is a longitudinal sectional view of a principle portion of the component parts in the embodiment according to the present invention.

In the following, an embodiment of the present invention will be described with reference to FIGS. 1 to 3. FIG. 1 is a perspective view of each arranged component part of the present invention. FIG. 2 is a perspective view of the component parts viewed from the opposite side of FIG. 1. FIG. 3 is a longitudinal sectional view of a principle portion of the component parts.

As illustrated in FIGS. 1 to 3, the actuator in the present embodiment includes a permanent magnet rotor 1, a bobbin 2, a coil 3, a first stator 4, a second stator 5, and an output shaft 6.

After the permanent magnet rotor 1 is made of a magnetic and integrated with the output shaft 6, the permanent magnet rotor 1 is magnetized in the predetermined direction. In general, this magnetizing direction is set so as to respectively make N and S poles at the both sides sandwiching the output shaft. In the present invention, as will be described later, the number of the poles corresponds to the number of the stators, and six poles are magnetized in the radial direction.

Also, in the output shaft 6, an engagement portion 6a fitting into the second stator 5 is formed near one side of the permanent magnet rotor 1, and an engagement portion 6b fitting into the bobbin 2 is formed near the other side of the permanent magnet rotor 1. Further, restriction portions 6c are formed at both sides in the rotational direction of the permanent magnet rotor 1. The restriction portions 6c restrict the range where the permanent magnet rotor 1 is formed, and restrict the attachment position of the permanent magnet rotor 1.

The bobbin 2 is provided with: a winding portion 2a around which a coil is wound and which has a space for fitting the permanent magnet rotor 1 at the center portion of the bobbin 2; a winding portion 2b for a coil terminal; bearing portions 2c for penetrating the output shaft 6 therethrough at the both sides of the bobbin 2; plural attachment guide portions 2d and 2g for the first stator 4 and the second stator 5, respectively; and holes 2e and 2f into which the magnetic pole portions of the first stator 4 and the second stator 5 are inserted, respectively. The coil 3 is wound around the winding portion 2a of the bobbin 2, and a terminal 3a of the coil 3 is tied up with the winding portion 2b of the bobbin 2 and is soldered.

The first stator 4 is formed with: an attachment hole 4a into which the bearing portion 2c of the bobbin 2 is fitted; and inner magnetic pole portions 4b and outer magnetic pole portions 4c extending outward from the attachment hole 4a by a bending operation. Further, the first stator 4 is formed alternately with three inner magnetic pole portions 4b and three outer magnetic pole portions 4c, and formed with three guide holes 4d into which the guide portions 2d of the bobbin 2 are fitted. Three inner magnetic pole portions 4b are respectively inserted into the insertion holes 2e of the bobbin 2 and are arranged inside the coil 3. Further, three outer magnetic pole portions 4c are arranged outside the coil 3 wound around the bobbin 2.

The second stator 5 is formed with: an attachment hole 5a into which the output shaft 6 is fitted; and inner magnetic pole portions 5b and outer magnetic pole portions 5b extending outward from the attachment hole 5a by bending. Further, the second stator 5 is formed alternately with three inner magnetic pole portions 5b and three outer magnetic pole portions 5c, and formed with three guide holes 5d into which the guide portions 2g of the bobbin 2 are fitted. Three inner magnetic pole portions 5b are inserted into the insertion hole 2f of the bobbin 2 and are arranged inside the coil 3. Three outer magnetic pole portions 5c are arranged outside the coil 3 wound around the bobbin 2.

Herein, the second stator 5 is attached with the bobbin 2 in the direction opposite to the direction in which the first stator 4 is attached therewith. The inner magnetic pole portions 4b, 5b and the outer magnetic pole portions 4c, 5c which are formed in the first and the second stators 4, 5, are respectively arranged in the same inner circumferential surface and the same outer circumferential surface. Also, the output shaft 6 is attached at its end portion with a pinion gear, a driving member, or the like, not illustrated.

Also, the inner magnetic pole portions 4b and 5b are respectively formed in the first and second stator 4 and 5 and extend toward the inside of the coil 3 in the axial direction of the permanent magnet rotor 1. The inner magnetic pole portions 4b and 5b extend radially outward from the center of the original member. Therefore, the inner magnetic pole portions 4b and 5b can be freely formed without limiting the lengths thereof, so these portions can be made long to achieve the actuator having a reduced size and a high output.

That is, a conventional magnetic pole is formed by rising an original part extending inward, and the magnetic pole portion is limited in length. On the contrary, in the present invention, this portion can be freely formed, not limited in length. Thus, the magnetic flux generated around the coil 3 can be effectively transmitted to the permanent magnet rotor 1, thereby achieving the actuator having a reduced size and a high output.

Further, the inner magnetic pole portions 4b and 5b can be freely extended in the axial direction, thereby increasing the coil winding number without increasing the size of the coil 3. Furthermore, the output of the actuator can be improved, while the ratio of increase in the coil resistance to increase in the winding number is as small as possible. That is, the winding number of the coil can be increased, while the increase in the coil resistance is made as small as possible. Since the amount of the magnetic flux which can be generated is decided by multiplying the coil resistance by the current amount, so this configuration is suitable for increasing the magnetic flux amount.

Next, a description will be given of an operation method of the actuator configured in such a way. When predetermined drive pulse signals input to the input terminal 3a of the coil 3 from a known control circuit, not illustrated, the magnetic flux generated around the coil 3 energizes the magnetic pole portions 4b and 5b of the first stator 4 and the second stator 5 to have corresponding magnetic polarities in a known manner. Therefore, this exerts on the magnetic poles of the permanent magnet rotor 1 for rotation.

Next, the magnetic pole portions 4b and 5b of the first stator 4 and the second stator 5 are energized in such a manner as to correspond to a change in the sequential drive pulse signals, the permanent magnet rotor 1 continuously rotates sequentially. When the predetermined drive pulse signals are stopped, the operation of the permanent magnet rotor 1 is stopped. Additionally, when the operation of the permanent magnet rotor 1 is forcibly stopped, a known brake pulse is supplied to the coil 3.

Also, in a case where the permanent magnet rotor 1 is swung in the forward and reverse directions, the drive pulses alternatively input to the coil 3 in the forward and reverse directions. In response to the input signals, the permanent magnet rotor 1 is controlled to swing in the forward and reverse directions.

Such rotating operation and swinging operation of the permanent magnet rotor 1 drive a pinion or a driving member attached in the end portion of the output shaft 6 so as to be converted into predetermined mechanical displacements.

That is, a predetermined mechanism is driven by the rotation or the swinging of the pinion attached in the end portion of the output shaft 6. For example, a taking lens barrel of a camera is moved to a shooting mode position, and is further returned to the initial state. In addition, the focus adjustment operation of the taking lens in the camera is controlled. Furthermore, it is possible to drive a driving member to open and close shutter blades of the camera, and also to drive aperture blades to control a predetermined exposure value.

In the above embodiment, the output shaft 6 of the permanent magnet rotor 1 is supported by the bobbin 2 and the second stator 5. Therefore, as compared with a case where the positional relationship between the permanent magnet rotor 1 and the stators 4 and 5 is defined by plural parts located between the output shaft 6 and the stators 4 and 5, the number of the parts defining the positional relationship is reduced. This can suppress a fitting error caused by a manufacturing error of configuration components. It is therefore possible to reduce the designed gap between the permanent magnet rotor 1 and the inner magnetic pole portions 4b and 5b.

Also, accumulated errors in fitting might cause a variation in the gap. Thus, a variation in driving output might occur to lose the operational stability. However, such problems can be solved. This can reduce the air gap, thereby providing the actuator having an improved drive output, high drive efficiency, and operational stability.

Figure 4:
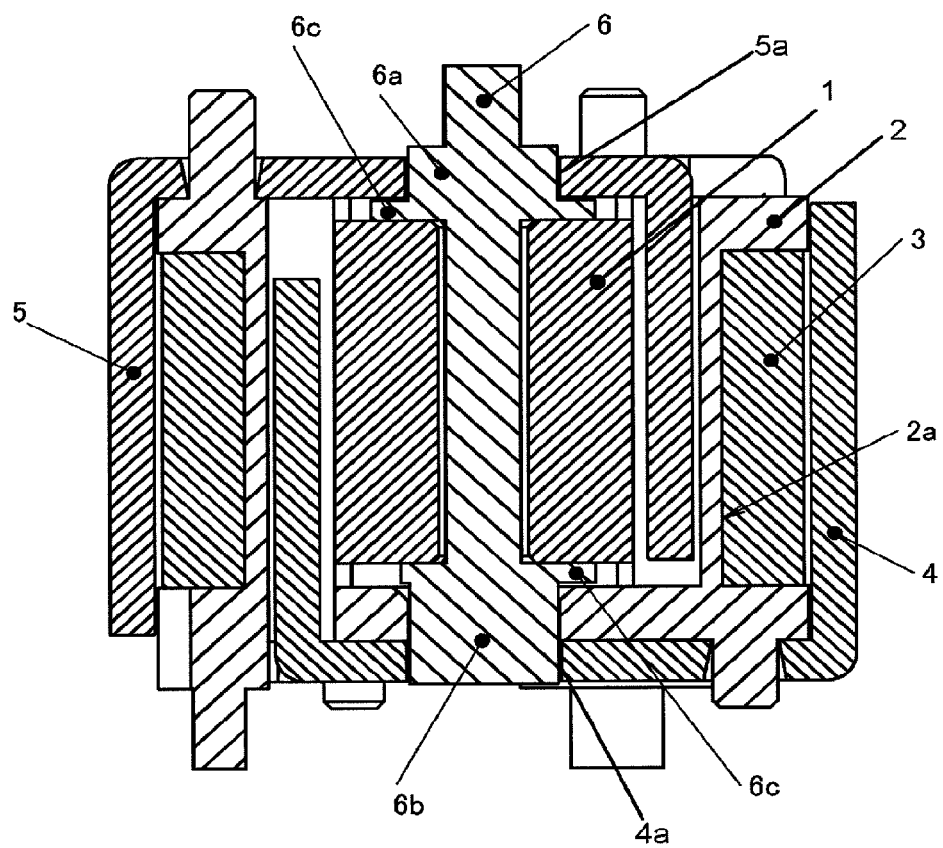
FIG. 4 is a longitudinal sectional view of a principle portion of component parts in another embodiment according to the present invention.

An actuator of the second embodiment according to the present invention will be described with reference to FIG. 4. In the present embodiment, the output shaft 6 is supported by the first stator 4 and the second stator 5.

This can further reduce the number of the parts defining the positional relationship. It is thus possible to design the smaller gap between the permanent magnet rotor 1 and the inner magnetic pole portions 4b and 5b. This can further reduce the air gap, thereby providing the actuator having an improved drive output, high drive efficiency, and operational stability.

With the actuator having the above mentioned configuration, the leakage of the magnetic flux can be reduced, and the magnetic flux generated around the coil 3 can be effectively transmitted to the magnetic pole portions of the stators 4 and 5. Further, each of the magnetic pole portions 4b and 5b can be arranged close to the permanent magnet rotor 1, thereby providing the actuator having a high output, a reduced size, and improved conversion efficiency.

Additionally, the above embodiment has three each for the inner magnetic pole portions 4b and 5b and the outer magnetic pole portions 4c and 5c. However, the number may be increased or decreased as needed. Also, since the six magnetic pole portions are provided each in the stators 4 and 5, the permanent magnet rotor 1 has six magnetized polarities. However, the present invention is not limited to this, and the number may be suitably increased or decreased.

Further, as for the method for supporting the output shaft 6, it has been exemplified that the bobbin 2 and the second stator 5 support the output shaft 6 and that the first stator 4 and the second stator 5 support the output shaft 6. However, both sides may be supported by the bobbin 2. That is, the following method is conceivable. The diameter of the engagement portion 6a fitting into the second stator 5 illustrated in FIG. 3 may be made small. The hole 5a of the second stator 5 and the small-diameter engagement portion 6a may be engaged with another member separately made of plastic. The plastic-made member may be secured to the bobbin 2.

While the exemplary embodiments of the present invention have been illustrated in detail, the present invention is not limited to the above-mentioned embodiments, and other embodiments, variations and modifications may be made without departing from the scope of the present invention.

Finally, several aspects of the present invention are summarized as follows.

According to an aspect of the present invention, there is provided an actuator including: a coil; a permanent magnet rotor secured to and rotatably supported by an output shaft inside the coil; a bobbin made of a non-magnetic material and around which the coil is wound; a first stator inserted into and secured to the bobbin in one direction, and including an inner magnetic pole portion and an outer magnetic pole portion extending inside and outside the coil in an axial direction of the rotor, respectively; and a second stator inserted into and secured to the bobbin in a direction opposite to the one direction, and including an inner magnetic pole portion and an outer magnetic pole portion extending inside and outside the coil in the axial direction of the rotor, respectively, wherein the inner magnetic pole portion and the outer magnetic pole portion of the first stator are arranged alternately in a circumferential direction, and the inner magnetic pole portion and the outer magnetic pole portion of the second stator are arranged alternately in the circumferential direction.

The inner magnetic pole portions and the outer magnetic pole portions of the first and second stators are formed to cross the inside and outside of the coil, and each of the stators is configured by a single part. Thus, an air gap is not provided at a middle of the magnetic path. Also, the inner magnetic pole portions and the outer magnetic pole portions of the first and second stators are alternately arranged in the circumferential direction, so the magnetic path of the magnetic flux is formed into a closed loop in each of the inner circumferential portion and the outer circumferential portion of the coil. Therefore, the loss caused by the leak magnetic flux can be restrained.

The inner magnetic pole portion and the outer magnetic pole portion of the first stator and the inner magnetic pole portion and the outer magnetic pole portion of the second stator each may be formed by bending a plurality of portions extending radially outward from a center portion of a flat plate.

Therefore, the effective magnetic pole portions can be formed in the first and second stators with ease by a simple machining operation. Also, the inner magnetic pole portion that extends toward the inside of the coil in the axial direction of the rotor can be freely formed without limitation of the length of the inner magnetic pole portion, so this portion can be made long to achieve an actuator having a reduced size and a high output.

The outer magnetic pole portion of the first stator may face the inner magnetic pole portion of the second stator through the coil.

It is therefore possible to form a closed loop of the magnetic path of the magnetic flux in each of the inner circumferential portion and the outer circumferential portion of the coil. Therefore, the loss caused by the leak magnetic flux can be restrained.

The bobbin and one of the first and second stators may support the output shaft of the permanent magnet rotor.

This can suppress the positional displacement of the magnetic pole portion of each stator relative to the output shaft of the permanent magnet rotor, thereby providing the uniform gap between the permanent magnet rotor and each magnetic pole portion. That is, the gap between the permanent magnet rotor and each magnetic pole portion is set by fitting the minimum parts with each other. Thus, the gap is defined in consideration of only a manufacturing error of both parts. An operation error caused by the manufacturing error of the parts can be avoided even when the narrow gap is set.

The first and second stators may support the output shaft of the permanent magnet rotor.

This can also suppress the positional displacement of the magnetic pole portion of each stator relative to the output shaft of the permanent magnet rotor, thereby providing the uniform gap between the permanent magnet rotor and each magnetic pole portion.

The bobbin and the first and second stators may be provided with a guide portion for positioning the bobbin and the first and second stators.

This can suppress the positional displacement of the stator relative to the bobbin. This results in reducing an attachment error of the stator with respect to the coil, thereby ensuring the uniformity of the magnetic path gap with ease.

The outer magnetic pole portions of the first and second stators may be formed in a same circumferential surface, and the inner magnetic pole portions of the first and second stators may be formed in a same circumferential surface different from the circumferential surface.

This can uniform the gap between the permanent magnet rotor and each magnetic pole portion, thereby stabilizing the magnetic path.

The first and second stators may have the same shape.

With such a configuration, common parts can be used for the actuators, so the manufacturing cost can be saved.

What is claimed is:

1. An actuator comprising:
   a coil;
   a permanent magnet rotor secured to and rotatably supported by an output shaft inside the coil;
   a bobbin made of a non-magnetic material and around which the coil is wound;
   a first stator inserted into and secured to the bobbin in one direction, and including an inner magnetic pole portion and an outer magnetic pole portion extending inside and outside the coil in an axial direction of the rotor, respectively; and
   a second stator inserted into and secured to the bobbin in a direction opposite to the one direction, and including an inner magnetic pole portion and an outer magnetic pole portion extending inside and outside the coil in the axial direction of the rotor, respectively,
   wherein the inner magnetic pole portion and the outer magnetic pole portion of the first stator are arranged alternately in a circumferential direction, and
   the inner magnetic pole portion and the outer magnetic pole portion of the second stator are arranged alternately in the circumferential direction.

2. The actuator of claim 1, wherein the inner magnetic pole portion and the outer magnetic pole portion of the first stator and the inner magnetic pole portion and the outer magnetic pole portion of the second stator are each formed by bending a plurality of portions extending radially outward from a center portion of a flat plate.

3. The actuator of claim 1, wherein the outer magnetic pole portion of the first stator faces the inner magnetic pole portion of the second stator through the coil.

4. The actuator of claim 3, wherein the bobbin and one of the first and second stators support the output shaft of the permanent magnet rotor.

5. The actuator of claim 3, wherein the first and second stators support the output shaft of the permanent magnet rotor.

6. The actuator of claim 1, wherein the bobbin and the first and second stators are provided with a guide portion for positioning the bobbin and the first and second stators.

7. The actuator of claim 1, wherein
the outer magnetic pole portions of the first and second stators are formed in a same circumferential surface, and
the inner magnetic pole portions of the first and second stators are formed in a same circumferential surface different from the circumferential surface.

8. The actuator of claim 1, wherein the first and second stators have the same shape.

\* \* \* \* \*